United States Patent

[19]

Peterson

[11] Patent Number: 6,010,784

[45] Date of Patent: Jan. 4, 2000

[54] PAPERBOARD LAMINATE FOR PHARMACEUTICAL BLISTER PACKAGING USING A HOT MELT ADHESIVE AND CALCIUM CARBONATE BLEND

[75] Inventor: Ralph Scott Peterson, Clifton Forge, Va.

[73] Assignee: Westvaco Corporation, New York, N.Y.

[21] Appl. No.: 09/058,994

[22] Filed: Apr. 13, 1998

[51] Int. Cl.[7] ............................... B32B 23/08; B32B 7/12
[52] U.S. Cl. ................. 428/354; 428/349; 428/511; 428/537.5
[58] Field of Search ....................... 428/349, 354, 428/507, 511, 537.5, 34.2; 206/471, 461

[56] References Cited

U.S. PATENT DOCUMENTS

| | | |
|---|---|---|
| 3,734,798 | 5/1973 | Dooley ................................ 156/308 |
| 5,091,261 | 2/1992 | Casey et al. . |
| 5,129,527 | 7/1992 | Lataix . |
| 5,169,001 | 12/1992 | Scheibel . |
| 5,209,354 | 5/1993 | Thornhill et al. . |
| 5,297,679 | 3/1994 | Rondone et al. . |
| 5,307,934 | 5/1994 | Hagner . |
| 5,349,168 | 9/1994 | Wilen ...................................... 219/730 |
| 5,377,836 | 1/1995 | Eisenbraun . |
| 5,426,141 | 6/1995 | Akao ...................................... 524/110 |
| 5,486,390 | 1/1996 | Burns et al. . |
| 5,580,946 | 12/1996 | Mann ......................................... 528/73 |
| 5,609,246 | 3/1997 | Borghorst et al. . |

*Primary Examiner*—Daniel Zirker
*Attorney, Agent, or Firm*—J. R. McDaniel; R. L. Schmalz

[57] ABSTRACT

This invention relates to paperboard laminates for pharmaceutical blister packaging. Such structures of this type, generally, employ a hot melt adhesive and calcium carbonate ($CaCO_3$) blend which is capable of sealing to polytrichlorofluoroethylene (Aclar®). Aclar® film is commonly used for high moisture barrier packaging in pharmaceutical applications.

9 Claims, 3 Drawing Sheets

PAPERBOARD LAMINATE FOR PHARMACEUTICAL BLISTER PACKAGING USING A HOT MELT ADHESIVE AND CALCIUM CARBONATE BLEND

BACKGROUND OF THE INVENTION

1. Field of the Invention

This invention relates to paperboard laminates for pharmaceutical blister packaging. Such structures of this type, generally, employ a hot melt adhesive and calcium carbonate ($CaCO_3$) blend which is capable of sealing to polytrichlorofluoroethylene (Aclar®). Aclar® film is commonly used for high moisture barrier packaging in pharmaceutical applications.

2. Description of the Related Art

Blister packages are commonly formed by adhering a rigid, preformed plastic blister or product holding capsule to an underlying support of paperboard or the like, with the product confined between them. The plastic blister is generally formed from a clear, moldable material such as polyvinyl chloride (PVC). In order to get the plastic blister to adhere to the paperboard, an adhesive coating must be applied to the surface of the paperboard where the blister is attached. There are a number of extrudable adhesive resins available which will adhere to PVC, but not all are readily adhered to paperboard.

It is known in the art to use ethylene-methyl acrylate (EMA) as an adhesive coating for blister pack applications. EMA could be applied to paperboard using a conventional chill roll apparatus provided a chill roll release agent was used in the EMA. However, use of the chill roll release agent presented difficulty in getting the EMA to adhere to the paperboard. Removal of the chill roll release agent solved the product problem (adhesion of the EMA to the paperboard), but this created a production problem, i.e., adhesion of the EMA to the chill roll itself.

Finally, it is known to produce a blister pack laminate which is comprised of coextruding EMA with a polyolefin, preferably, a low density polyethylene (LDPE), which adheres to both paperboard and EMA, onto a paperboard substrate. The EMA contains a chill roll release agent to achieve good release from the chill roll, while the LDPE securely bonds the EMA to the uncoated surface of the paperboard despite the presence of the chill roll release agent.

Exemplary of such prior art is commonly assigned U.S. Pat. No. 5,091,261 ('261), to H. B. Casey et al., entitled "Paperboard/Polymer Laminate for Blister Pack". While the '261 patent has met with some degree of commercial success, the laminate in the '261 patent will not seal to Aclar®. Consequently, a more advantageous laminate, then would be presented if the laminate could seal to Aclar®.

It is apparent from the above that there exists a need in the art for a paperboard laminate which can be employed in pharmaceutical blister packaging, but which at the same time is capable of being sealed to Aclar®.

It is a purpose of this invention to fulfill this and other needs in the art in a manner more apparent to the skilled artisan once given the following disclosure.

SUMMARY OF THE INVENTION

Generally speaking, this invention fulfills these needs by providing a blister pack substrate constructed from a laminate, comprising a paperboard layer having first and second sides, an extruded layer of a polyolefin having first and second sides such that the first side of the polyolefin layer is permanently bound to the second side of the paperboard layer, an extruded layer of a blend of a blister pack adhesive and cutting/blocking improvement agent permanently bound to the second side of the polyolefin layer, and a clay coating located on the first side of the paperboard layer for providing good printability.

In certain preferred embodiments, the polyolefin layer is constructed of low density polyethylene (LDPE). Also, the blister pack adhesive is ethylene vinyl acetate (EVA). Finally, the cutting/blocking improvement agent is calcium carbonate ($CaCO_3$).

In another further preferred embodiment, the use of the polyolefin layer along with the extrusion of the blend of the blister pack adhesive and the cutting/blocking improvement agent allows the paperboard laminate to be sealed to Aclar®.

The preferred blister pack substrate, according to this invention, offers the following advantages: lightness in weight; ease of assembly; good stability; excellent durability; excellent economy; and the ability to seal to Aclar®. In fact, in many of the preferred embodiments, these factors of ease of assembly, durability, economy, and ability to seal Aclar® are optimized to the extent that is considerably higher than heretofore achieved in prior, known blister pack substrates.

BRIEF DESCRIPTION OF THE DRAWING

The above and other features of the present invention, which will become more apparent as the description proceeds, are best understood by considering the following detailed description in conjunction with the accompanying drawings, wherein like characters represent like parts throughout the several views and in which.

DETAILED DESCRIPTION OF THE INVENTION

Figure 1:
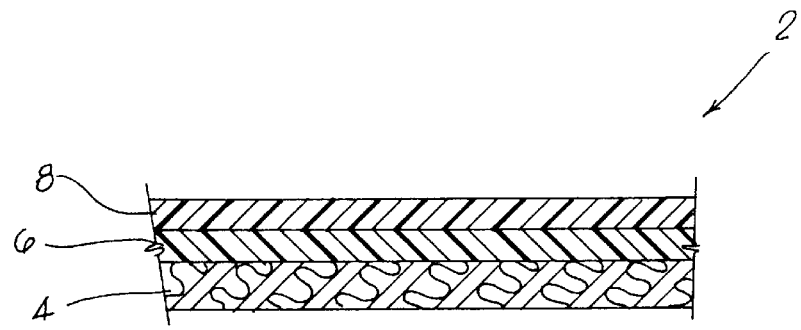
FIG. 1 is a schematic illustration of a paperboard/polymer laminate, according to the present invention.

With reference first to FIG. 1, there is illustrated an advantageous paperboard/polymer laminate 2 for use of the concepts of this invention. Laminate 2 includes, in part, paperboard layer 4, extruded polyolefin layer 6, and extruded blend of blister pack adhesive and cutting/blocking improvement agent 8.

Paperboard substrate 4 of the present invention is, typically, constructed from a 0.018 inch thick bleached sulphate sheet. Definitively, the term paperboard describes paper within the thickness range of 0.008 to 0.028 inches. The invention is relevant to full scope of such a range, as applied to packaging and beyond.

When used for food carton stock, paperboard is usually clay coated on a least one side surface and frequently on both sides. The paperboard trade characterizes a paperboard web or sheet that has been clayed coated on one side as C1S and C2S for a web coated on both sides. Compositionally, the paperboard coating is a fluidized blend of minerals such as coating clay, calcium carbonate, and/or titanium dioxide with starch or adhesive which is smoothly applied to a traveling web. Successive surface densification and polishing by calendaring finishes the mineral coated surface to a high degree of smoothness and superior graphic print surface.

When C1S paperboard is used for food packaging, the clay coated surface is prepared as the outside surface, i.e., the surface not in contact with the food.

Polyolefin layer 6 is, preferably, an extrudable material which adheres to both the uncoated surface of the paperboard and the plastic blister adhesive material. Layer 6 comprises low density polyethylene (LDPE), but may also comprise linear low density polyethlyene (LLDPE), high density polyethlene (HDPE) and copolymers of polyethylene (PE).

Finally, extruded layer 8 is preferably an extrusion of a blister pack adhesive blended with a cutting/blocking improvement agent. Preferably, the blister pack adhesive is an ethylene vinyl acetate (EVA) based hot melt blended with calcium carbonate ($CaCO_3$) such as HL 9918-X or HL 9936, produced by HB Fuller of St. Paul Minn., but may also comprise ethylene-methyl acrylate (EMA), ionomers (Surlyn®) and acrylic copolymers blended with the cutting/blocking improvement agent.

The coat weight of the LDPE is on the order of 5 to 10 pounds per ream (ream size 3,000 square feet), but a six pound per ream coating is preferred. The coat weight of the extrusion of the blend of the blister pack adhesive and cutting/blocking improvement agent is on the order of 4 to 7 pounds per ream, with a coat weight of five pounds per ream being preferred. Layer 8 is comprised of approximately 85% by weight blister pack adhesive and 15% cutting/blocking improvement agent.

By providing the laminate according to this invention, the EVA/$CaCO_3$ blend layer may be made thinner and lighter than the EVA layers of the prior art because of the presence of LDPE in the laminate. The product is also cheaper to manufacture because LDPE is less expensive than EVA.

It is important to point out that the use of the blister pack adhesive allows the laminate 2 to be easily sealed to Aclar®, produced by Allied Signal of Moristown, N.J. The use of the $CaCO_3$ improves the die cutting of laminate 2 and reduces blocking of laminate 2. This is because the $CaCO_3$ produces localized fracture initiation points which create cleaner cuts and thus improve die cutting and reduce blocking.

Figure 2:
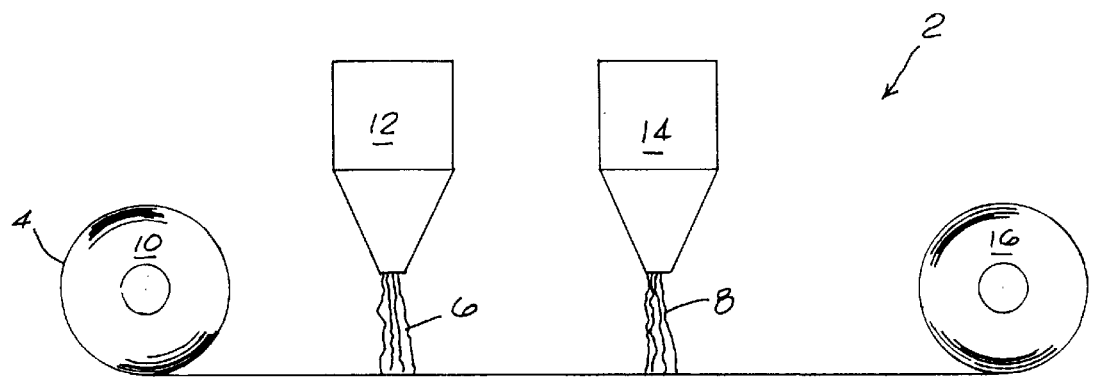
FIG. 2 is a schematic illustration of the extrusion process for producing the laminate of the present invention.

FIG. 2 diagrammatically illustrates the extrusion process for producing laminate 2 of the present invention. Paperboard 4 is conventionally fed from feed roll 10 past conventional extrusion apparatus 12 where polyolefin layer 6 is placed upon paperboard 4. Suitable extrusion apparatus is well known to those skilled in the art for carrying out this step.

After polyolefin layer 6 is placed on paperboard layer 4, conventional extrusion apparatus 14 places extrusion blend layer 8 over top of polyolefin layer 6. Once extrusion layer 8 is placed upon polyolefin layer 6, laminate 2 is formed and rolled up into roll 16. From there, the product can be die cut into substrates for blister packages in a conventional die cutting process.

Figure 3:
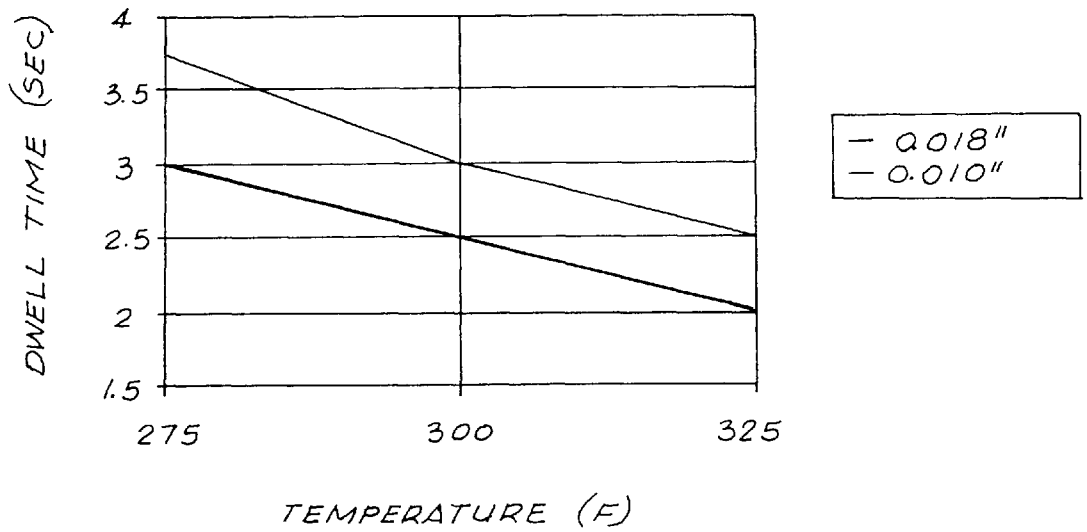
FIG. 3 is a graphical illustration of dwell time (in seconds) versus temperature (in °F.)
Figure 4:
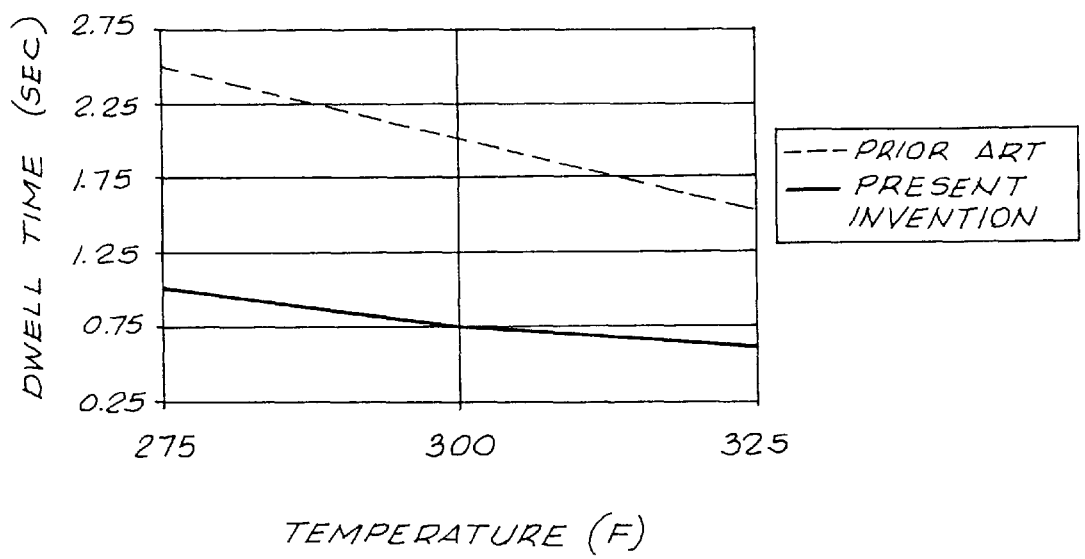
FIG. 4 is another graphical illustration of dwell time (in seconds) versus temperature (in °F.)
Figure 5:
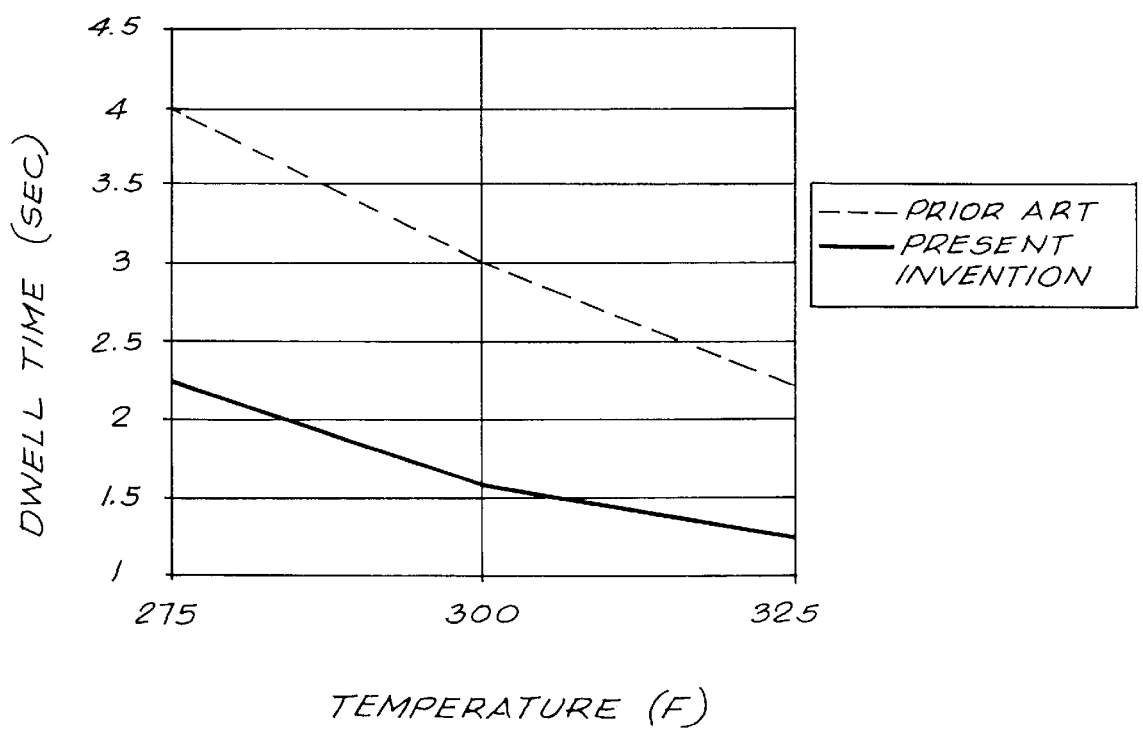
FIG. 5 is still another graphical illustration of dwell time (in seconds) versus temperature (in °F.).

As further proof of the novel aspects of the present invention, FIGS. 3, 4, and 5 are presented. The curves shown in FIG. 3 show that the laminate of the present invention improves the heat seal performance by reducing the dwell time (the time in which it takes the blister pack to be adhered to the laminate). This is applicable to 0.010 inch and 0.018 inch thick paperboard substrates, as well as other paperboard thicknesses.

FIGS. 4 and 5 compare curves of the prior art and the present invention by dwell time (sec) versus temperature (degree). It must be noted that in this case, the previously discussed '261 reference to Casey et al. was used as the prior art. As clearly shown in FIGS. 4 and 5, the dwell times were greatly reduced when the present invention was employed, as opposed to using the prior art. Clearly, cost savings can be expected by using the laminate 2 of the present invention because the laminate 2 reduces dwell time.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A blister pack substrate constructed from a laminate consisting of:

a paperboard layer having first and second sides;

a separately extruded layer of a polyolefin having first and second sides such that said first side of said polyolefin layer is permanently bound to said second side of said paperboard layer;

a separately extruded layer of a blend of a blister pack adhesive and a cutting/blocking improvement agent permanently bound to said second side of said polyolefin layer, wherein said blister pack adhesive consists of ethylene vinyl acetate and said cutting/blocking improvement agent consists of calcium carbonate; and a clay coating located on said first side of said paperboard layer for providing good printability.

2. The substrate, as in claim 1, wherein said polyolefin is further comprised of:

low density polyethylene (LDPE).

3. A method for producing a paperboard/polymer laminate for use in the preparation of a substrate for blister packages which consists of the steps of:

separately extruding a layer of a polyolefin onto a first side of a paperboard substrate;

separately extruding onto said polyolefin layer a blend of
a) a first molten material consisting of a blister pack adhesive, wherein said blister pack adhesive consists of ethylene vinyl acetate; and
b) a second molten material consisting of a cutting/blocking improvement agent, wherein said cutting/blocking improvement agent consists of calcium carbonate; and coating a second side of said paperboard substrate with a clay coating to provide good printability.

4. The method, as in claim 3, wherein said polyolefin is further comprised of:

low density polyethylene (LDPE).

5. The method, as in claim 3, wherein said polyolefin layer has a coat weight of between 5–10 lb. per ream.

6. The method, as in claim 5, wherein said polyolefin layer has a coat weight of 6 lb. per ream.

7. The method, as in claim 3, wherein said extruded blend layer has a coat weight of between 4–7 lb. per ream.

8. The method, as in claim 7, wherein said extruded blend layer has a coat weight of 5 lb. per ream.

9. The method, as in claim 3, wherein said extruded blend layer is further comprised of:

approximately 85% by weight of said first molten material and 15% by weight of said second molten material.

* * * * *